Sept. 8, 1959 W. D. HOUGHTON 2,903,509

VIDEO SIGNAL RECORDING SYSTEMS

Filed July 1, 1955 6 Sheets-Sheet 1

INVENTOR.
WILLIAM D. HOUGHTON.
BY
[signature]
ATTORNEY

Sept. 8, 1959 W. D. HOUGHTON 2,903,509

VIDEO SIGNAL RECORDING SYSTEMS

Filed July 1, 1955 6 Sheets-Sheet 2

INVENTOR.
WILLIAM D. HOUGHTON
BY
[signature]
ATTORNEY

Sept. 8, 1959 W. D. HOUGHTON 2,903,509

VIDEO SIGNAL RECORDING SYSTEMS

Filed July 1, 1955 6 Sheets-Sheet 3

INVENTOR.
WILLIAM D. HOUGHTON
BY
ATTORNEY

VIDEO SIGNAL RECORDING SYSTEMS

Filed July 1, 1955 6 Sheets-Sheet 4

INVENTOR.
WILLIAM D. HOUGHTON
BY
ATTORNEY

Sept. 8, 1959 W. D. HOUGHTON 2,903,509

VIDEO SIGNAL RECORDING SYSTEMS

Filed July 1, 1955 6 Sheets-Sheet 5

INVENTOR.
WILLIAM D. HOUGHTON

BY [signature]

ATTORNEY

VIDEO SIGNAL RECORDING SYSTEMS

INVENTOR.
WILLIAM D. HOUGHTON
BY [signature]
ATTORNEY 2,903,509
Patented Sept. 8, 1959

2,903,509

VIDEO SIGNAL RECORDING SYSTEMS

William D. Houghton, Princeton, N.J., assignor to Radio Corporation of America, a corporation of Delaware Application July 1, 1955, Serial No. 519,420
7 Claims. (Cl. 178—6.6)

This invention is a continuation-in-part of my previously filed applications, Serial No. 469,415, filed November 17, 1954, and Serial No. 369,874, filed July 23, 1953, now both abandoned.

This invention relates to the recording of electrical impulses, and more particularly to the recording of television signals on a magnetic medium.

The recording of electrical impulses upon a magnetic material has been developed to the point where the recording of audio signals may be accomplished with reasonably good fidelity. A paper or plastic tape to which is applied a uniform film or layer of a ferromagnetic material, such as iron oxide, is usually employed as the recording medium. The signals to be recorded are applied to a magnetic recording head having a gap in juxtaposition with the magnetic material on the tape. A fixed bias is generally applied to the head along with the signal in order to improve recording fidelity. This bias may be a fixed amplitude alternating current signal of a frequency considerably in excess of the highest frequency. The characteristics of known recording systems using such tape are satisfactory for use within the audio frequency range, that is to say, from 30 to 20,000 cycles per second. Within this range speeds of 1⅞″, 3¾″, 7½″ or 15″ per second have proved satisfactory for obtaining reasonable audio fidelity, the higher speeds giving increasingly better high frequency response. For higher frequencies, such as encountered in television signals where 4 megacycle components are not uncommon, it is found that if magnetic tape recording is to be effective, the tape speed must be considerably increased over that used for recording audio frequency signals. As a rule then, the frequency range capabilities of the overall tape recording system is a function of the speed of the tape recording medium.

The basic characteristics of most magnetic tape recording systems currently in use are such that at a given speed the frequency response rises at a rate of approximately 6 db per octave. However, at tape speeds much below 15″ per second and with standard magnetic tape recording heads, frequency response characteristics tend to drop at frequencies above 5,000 c.p.s. to 7,000 c.p.s. It is, therefore, necessary to pre-emphasize or equalize the high frequency components of the signals it is desired to record in order to overcome this drop in the high frequency response. Also, some low frequency accentuation is sometimes employed in cases when it is desired to record very low frequencies, the recorded wavelength of which as defined on the tape, is large compared to the dimensions of the recording head.

Effective equalization of magnetic tape recording system characteristics becomes increasingly difficult as the frequency of the signal components to be recorded are extended up to four megacycles and beyond, as is necessary in attempting to record television video signals.

As in most electrical communications systems so it is in magnetic tape recording systems, the overall frequency response to the system is not the only determinant of its ability to faithfully record and reproduce complex electrical signals. The phase characteristics and transient response of the system must be taken into consideration. In magnetic tape recording systems it has been found that the magnetic materials included in the magnetic recording and playback heads as well as the magnetic tape itself may have certain nonlinear magnetization characteristics which may be attributable to magnetic molecular inertia. This magnetic inertia is expressed by the apparent difficulty a given tape recording system has in faithfully recording and reproducing the steep edges of certain signal waveforms. The type of distortion produced by this inertia in some instances appears similar to electrical phase distortion whereby even in the presence of wide range frequency response the waveform of a reproduced signal is undesirably distorted.

In the practice of the present invention, means are provided for supplementing the magnetic field representing the signal to be recorded as it is imposed on the tape medium by what will be termed hereinafter as a magnetic transfer correction field or simply, correcting field. This component of the magnetic recording field also supplements any conventional magnetic recording bias which may be employed. The transfer correction component may, in accordance with the present invention, be produced by mixing with the signal to be recorded, a transfer correcting signal the waveform and conditionally the timing of which is determined by the waveform characteristics of the signal to be recorded. This transfer correcting signal may be applied directly to the recording head along with recording bias and the signal to be recorded, or it may be applied to a supplementary recording head acting on and through the base side of the magnetic recording tape to produce the correction field component at the surface of the magnetic coating at a point thereon where the recording head is acting to record signal information.

A principal object of this invention is to provide a means for, and method of, faithfully impressing signals of an extended bandwidth and sharp transients upon a magnetic material.

Another object of this invention is to provide a system whereby television signals may be recorded upon a medium so that almost instantaneous playback is possible.

Still another object of the invention is to record television signals having high frequency components with good response at all television signal frequencies.

Another object of the present invention is to provide a magnetic recording system in which both the frequency response and transient response is greatly improved over prior art systems.

It is a further object of the present invention to provide a novel means for supplementing the normal magnetic recording field variations in a magnetic recording system with a magnetic transfer correcting component which is so related to amplitude transitions in the signal to be recorded that a more faithful recording of the desired signal results.

Yet another object is to provide a means and method for controlling the speed of a movable medium in tape recording systems.

A further object is to provide apparatus for governing the speed of magnetic tape used in recording and reproducing television signals.

In realizing the improved speed control characteristics of the present invention, synchronizing information from a standard source is compared with recorded synchronizing information and control of the speed of the tape transport mechanism is exercised in response to control signals derived by such comparison.

A more detailed and functional explanation of this invention will be given in connection with the accompanying drawings, in which.

Figure 1:
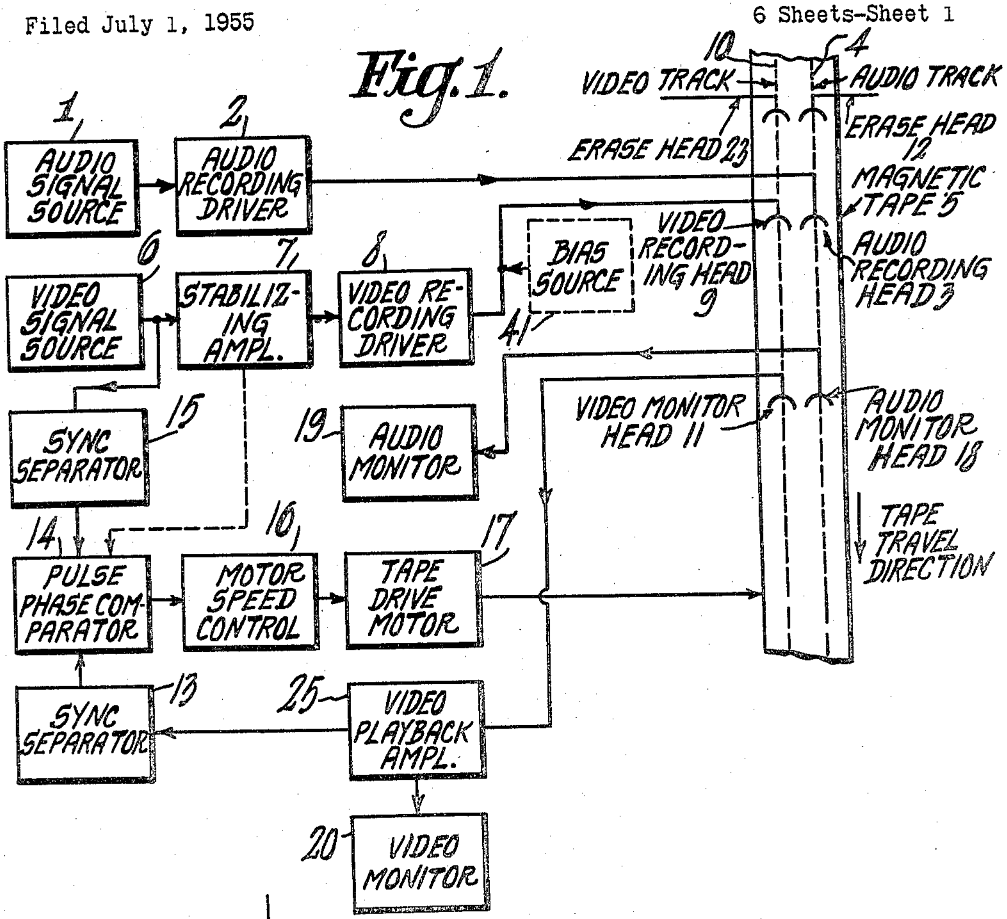
Fig. 1 is a block diagram showing one form of an overall recording system.

Referring in more detail to Fig. 1, it is seen that audio signals from source 1 are applied to audio recording driver 2 which energizes audio recording head 3 to impress the sound signals on audio track 4 of magnetic tape 5. The recording driver 2 may be any high quality recording amplifier. The details of such a driver do not concern the substance of this embodiment of the present invention since the audio recording art has developed sufficiently to permit the choice of any one of a number of acceptable circuits for this purpose.

The video signal is derived from source 6 and is fed to stabilizing amplifier 7. The source 6 may be a television pickup camera or the video section of a television receiver as the case may be. Stabilizing amplifier 7 contains circuitry which restores the incoming signal from the source 6 to standard specifications or to a desired variant thereof. Customarily, the stabilizing amplifier may contain stages which amplify the picture information, restore the sync pulse to the proper amplitude by a "stretching" circuit, clip noise from the sync and blanking signals, and clamp the signal to predetermined reference points. The stabilizing amplifier may also contain a circuit for separating sync from the input composite video wave. Stabilizing amplifiers have been used in monochrome television transmitters such as RCA Model TA–5B as described at page 34 of "Broadcast News" for May, 1948, and the RCA Model TA–5C as listed in the RCA "AM–FM Broadcast Equipment Catalog—1950," at page 189. RCA Model TA–5D, a later variation of the stabilizing amplifier referred to above, will also accomplish the desired result. A general discussion of the function of stabilizing amplifiers may be found in "Video Handbook" by Scherag and Roche (William F. Boyce, publisher) at page 355, et seq.

By the use of the amplifier 7 the ratio of the picture information to the sync is controlled so as to utilize the entire range of the magnetic system more efficiently. Its output is applied to video recording driver 8 which, as will be explained in detail below, contains phase and frequency compensating circuits designed to improve overall transient and frequency responses. The driver 8 is coupled to recording head 9 to which bias from source 41 may also be concurrently applied. Bias source 41 may be of the D.C. variety and is shown in dashed lines since its use is optional.

According to one form of the invention the magnetic recording field applied to the magnetic recording medium comprises not only the bias component and intelligence signal component but also a magnetic transfer correcting component. This transfer correcting component is a magnetic field variation which is effective to make possible the minute delineations in the strength of the remanent field stored by the recording medium in correspondence with sharp high frequency transitions in the amplitude of the intelligence signal. The magnitude of the correcting component, in accordance with the present invention, is made a function of the amplitude changes in the intelligence signal to be recorded while the timing of the correcting component is controlled by the timing of the sharp amplitude transitions. In another form of the invention the transfer correcting component takes the form of an alternating current variation of the recording field which variation is critically phased or timed with respect to the edges defined by the sharp amplitude transitions in the intelligence signal waveform.

For erase purposes it has been found that if the tape 5 has been presaturated by a constant magnetic field, accidental or intentional magnetization of the tape is obliterated. However, it is also possible to erase the tape by applying an A.-C. field to the tape before or while information signals are being impressed thereupon by head 9. Should the method of prior A.-C. erase be employed, an A.-C. signal could be coupled from a source (not shown) to head 23 which would produce the varying magnetic field in its immediate vicinity. If a constant field is desired it may be achieved by impressing a D.-C. on head 23, or by placing a relatively strong permanent magnet in contact with the tape before the latter is passed into contact with head 9.

In practice very satisfactory results have been obtained through the use of recording heads specially constructed for high frequency recording whose characteristics and a full description thereof may be found in the co-pending application of J. A. Zenel and A. R. Morgan, Serial No. 380,854, filed September 17, 1953 and assigned to the same assignee as the present invention.

The output of video source 6 is applied to sync separator 15. It is to be noted that another magnetic head 11 is located at a point on the video track 10 to take off the video signals a short time after they have been recorded by head 9. The head 11 thus picks off the signals and feeds them to playback amplifier 25 which also has unique circuitry designed to give wide frequency response with the highest possible signal-to-noise ratio. The output of amplifier 25 is applied to sync separator 13 which feeds pulse phase comparator 14 as does sync separator 15. As shown, separator 15 is an independent unit coupled to source 6, but it may be a constituent part of the stabilizing amplifier 7 so that the alternative dashed line connection may be used. In comparator 14 an error voltage is derived which is applied to a motor speed control 16 which in turn controls the speed of tape drive motor 17. Thus, if the tape 5 begins to increase in velocity the sync signal input to comparator 14 from separator 13 will be early and a resultant voltage will be derived which will be applied to device 16 to slow down the motor 17. The converse is true should the tape 5 begin to decelerate. It should be pointed out that satisfactory results may also be obtained if the sync signals are put on a separate track and the picture information on its own track.

For monitoring purposes, a monitor head 18 may be placed in contact with audio track 4 which applies the audio signal to audio monitor 19 so that the quality of the recorded sound may be continuously checked. Video monitor 20 which is coupled to amplifier 25 performs the same function for the picture information.

Figures 2, 3:
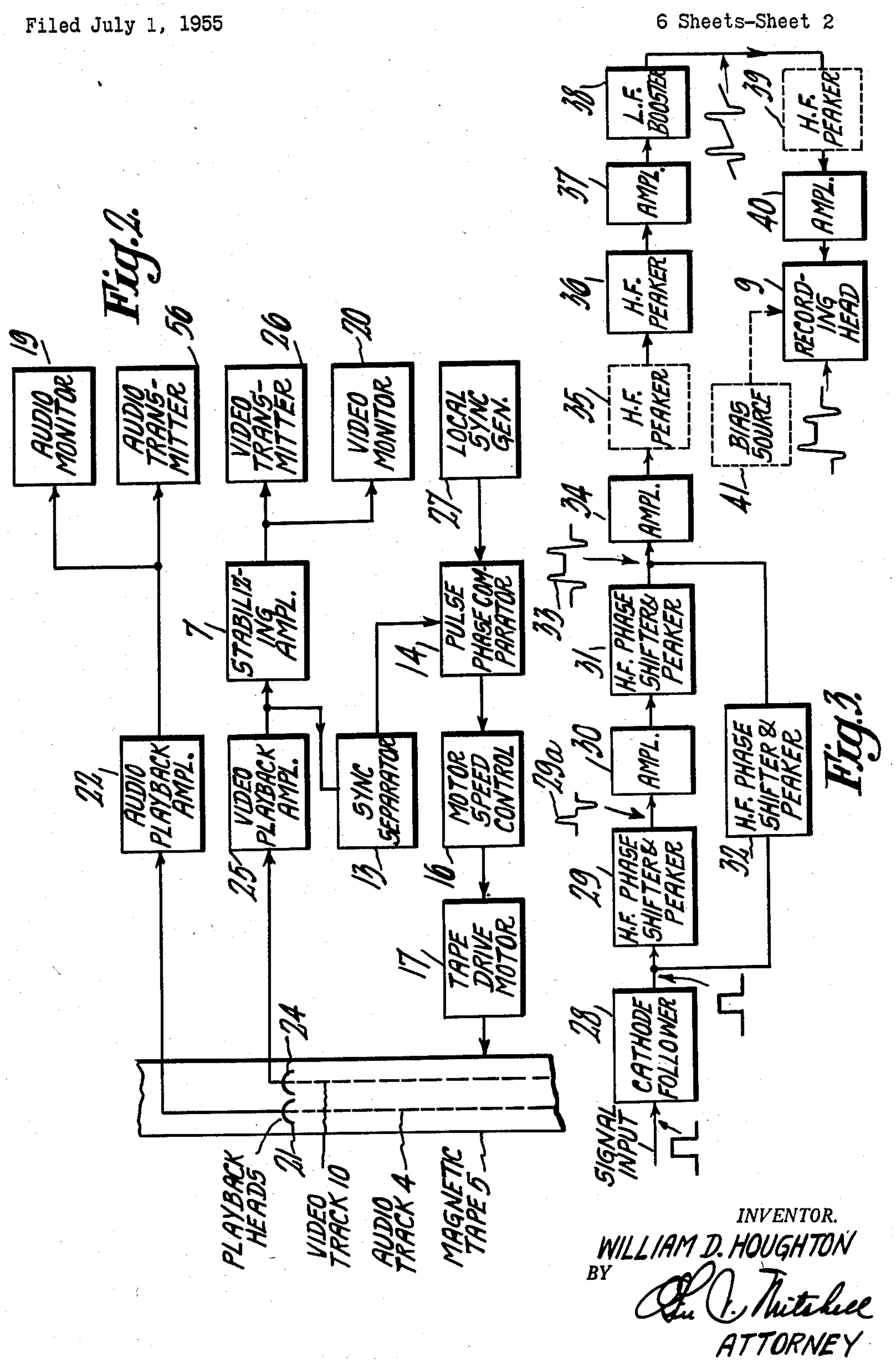
Fig. 2 is a block diagram of an overall playback system according to this invention.
Fig. 3 is a more detailed block diagram of the video recording driver which appears in Fig. 1.

Figure 2 shows an appropriate system for the playing back of signals recorded by the system illustrated in Fig. 1. Playback heads 21 and 24 pick up the signals on audio track 4 and video track 10, respectively, and feed them to corresponding amplifiers 22 and 25. Audio playback amplifier 22 may be any good amplifier used for playback purposes, many of which are well known in the tape recording art. After amplification by amplifier 22 of the signals delivered by the head 21, they are applied to audio transmitter 56 for broadcast purposes, for example. They may also be applied to audio monitor 19 which is the same as the monitor stage 19 alluded to in the explanation of Fig. 1. Video playback amplifier 25, which is the same as the similarly numbered stage in Fig. 1, amplifies the video signals to the proper level and applies them to stabilizing amplifier 7 which has already been discussed in connection with Fig. 1. The output of amplifier 7 may be applied, for example, to a video transmitter 26 for broadcast and to a video monitor 20 to maintain constant surveillance over the quality of the transmitted picture.

The tape velocity control arrangement in the playback apparatus differs somewhat from that at the recording end. Sync separator 13, which may be the same as the one illustrated in Fig. 1 and the same as sync separator 15, is coupled to playback amplifier 25. Sync signals are removed by separator 13 and applied to one input of pulse phase comparator 14 which may be the same as block 14 in Fig. 1. Sync signals from a calibrated and highly stable local sync generator 27 are applied to another input of comparator 14. Any discrepancy in the time of arrival of sync pulses from separator 13 and generator 27 will give rise to an error voltage in the output of comparator 14. The error voltage is then applied to means which minimizes variations in the speed of the medium relative to the playback head. For example, the error voltage is applied to a motor speed control 16 for controlling the speed of tape drive motor 17 which itself is frictionally or otherwise coupled to the tape 5 and determines its rate of travel.

Figure 3 shows in block form the interrelation of the various stages of form of video recording driver 8 shown in Fig. 1 which, in accordance with the present invention, is responsive to the intelligence signal to be recorded to form a driving signal for the recording head 9. As will hereinafter be seen, the signal thus applied to the recording head 9 will comprise an intelligence component and a magnetic transfer correcting component. This means that the recording field applied to the recording tape will vary in intensity not only in accordance with signal intelligence but also in a manner which in effect magnetically conditions the tape preceding and during those intervals when sharp transitions occur in the intelligence signal such that faithful recording of the transitions will be obtained.

An input signal to the arrangement of Fig. 3, obtained from the output of stabilizing amplifier 7, (Fig. 1) is applied to the input of a cathode follower stage 28. For the purposes of explanation, the input intelligence signal may be considered a square wave having a wide range of frequencies contained therein. Output signal from cathode follower 28 is applied to a high frequency phase shifter and peaker 29. Its output 29*a*, as illustrated, is applied to the input of amplifier stage 30. The output of the latter is applied to a high frequency phase shifter and peaker 31.

The output of cathode follower 28 is also applied to a high frequency phase shifter and peaker 32. The combined output of these parallel stages is recombined with the output of phase shifter 31 to produce a resultant waveform 33 having an intelligence component and a transfer correcting signal component. Actually, the transfer correcting component of the wave 33 may be attributed to the waveform 29*a* delivered by the high frequency phase shifter and peaker 29 as further operated upon by shifter and peaker 31. The resultant wave 33 causes an undershoot and overshoot in the magnetic recording field intensity at a time corresponding to the front edge of the square wave comprising the intelligence signal. This is followed by a corresponding overshoot and undershoot at the back edge of the square wave. The transfer correcting component itself which produces the undershoot and overshoot substantially corresponds to one cycle of a sine wave which is added to the signal it is desired to record at times defined by the waveform characteristics of the desired signal. Also the amplitude of the transfer correcting component is rendered a function of the amplitude of the desired signal. As will be seen hereinafter, there are certain advantages to developing the transfer correcting signal component of the present invention in the manner shown. However, it has been found useful to increase the frequency of the transfer correcting signal to a multiple of the highest frequency represented in the intelligence signal and applying the correcting signal only during the steep rise or fall times of the intelligence signal waveform.

In the embodiment of Fig. 3, however, this composite wave including the transfer correction component is fed to the input of amplifier 34 whose output may be coupled through a high frequency peaker 35 to a high frequency peaker 36. Peaker 35 is shown in dashed lines because it is optional since the effect of peaker 36 is sometimes sufficient. The output of peaker 36 is amplified by stage 37 whose output is coupled to a low frequency booster 38. The waveform at the output of stage 38 is as illustrated, and may be applied through a high frequency peaker 39 to the input of an amplifier 40 which may, of course, comprise several stages. The output of the latter amplifier 40 then drives recording head 9 in conjunction with bias derived from bias source 41, the output voltage waveform across the head 9 being as shown.

Figure 4:
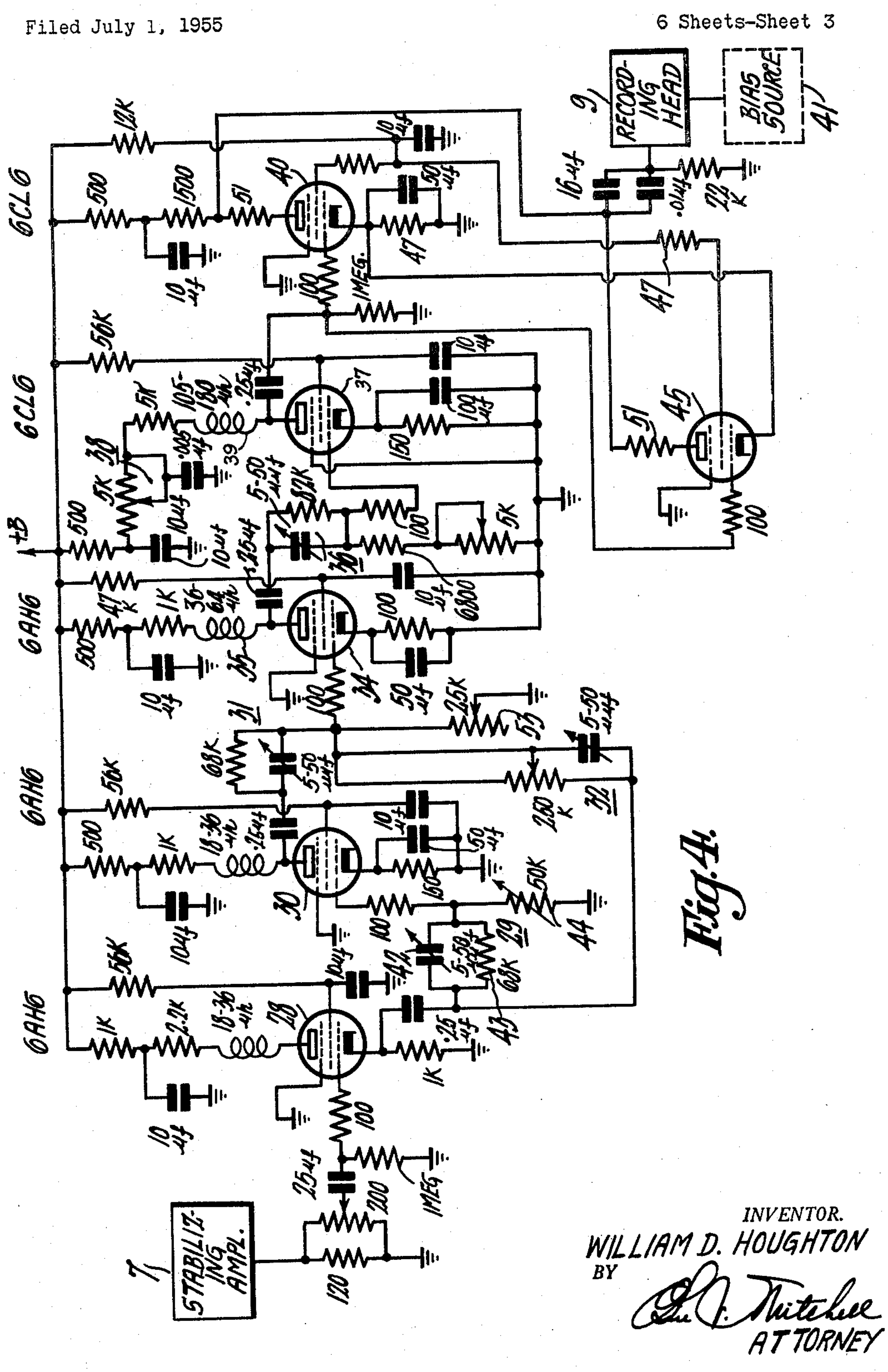
Fig. 4 is a circuit diagram of the video recording driver corresponding to Fig. 3.

The circuitry details of Fig. 3 are shown in Fig. 4. Stabilizing amplifier 7 which has set the ratio of sync amplitude to picture information amplitude at a desired value, and reduced low frequency variations which might have been introduced, is coupled by way of a .25 mfd. condenser and a 100 ohm resistor to the control electrode of a cathode follower tube 28. Its output takes two paths, one of which is through high frequency and phase shifting network 29 which includes variable condenser 42, resistor 43 and variable resistor 44. This network 29 is connected to the input electrode of amplifying pentode 30 by way of a 100 ohm resistor. The peaking part of network 29 is composed largely of condenser 42 and resistor 43. The ratio of the capacity of condenser 42 to the resistance of resistor 44 determines the magnitude of phase shift and the amplitude of the high frequencies in this path. The output of amplifier 30 is coupled to another high frequency phase shifter and peaking network 31 which includes a 68,000 ohm resistor in parallel with a variable condenser ranging from 5 to 50 mmf. and variable resistor 53.

Another portion of the output of cathode follower 28 is applied to a high frequency phase shifting network 32 consisting of a 5–50 mmf. variable condenser, a 250,000 ohm variable resistor and the 25,000 ohm variable resistor 53. This network shifts high frequency components from that portion of the video signal appearing in the output of tube 28 which is not passed through circuits 29, 30 and 31. The ratio of the 250,000 ohm variable resistor in series with the grid of tube 34 to the tapped portion of variable resistor 53 determines the phase shift of the high frequencies in this branch. At the input electrode of amplifier tube 34 there is thus a wave composed of a wave passed through phase shifter and peaker 31, and a wave from the phase shifter and peaker 32. The output of amplifier 34 is coupled to high frequency peaking coil 35, which with its distributed capacity, is a tank circuit. It is also coupled through a .24 mfd. condenser to high frequency peaker 36 which includes an 82,000 ohm resistor across a 5–50 mmf. variable condenser. The peaker 35 does not contribute much to the peaking action in comparison with peaker 36, and thus may be dispensed with if desired. Peaker 36 is coupled through a 100 ohm resistor to the control grid of amplifier stage 37 in whose plate circuit appears a high frequency peaker 39 (which may be omitted if desired) in series with a low frequency booster 38. The resulting output is applied via a .25 mfd. condenser from the plate of amplifier 37 and a 100 ohm resistor to the control grid of amplifier 40. The latter is in parallel with amplifier 45 which with amplifier 40 combines to produce an output level sufficient to drive recording head 9. A bias source 41, as explained above in connection with Fig. 1, may also be coupled to the recording head 9 to obtain the desired output.

Figure 5:
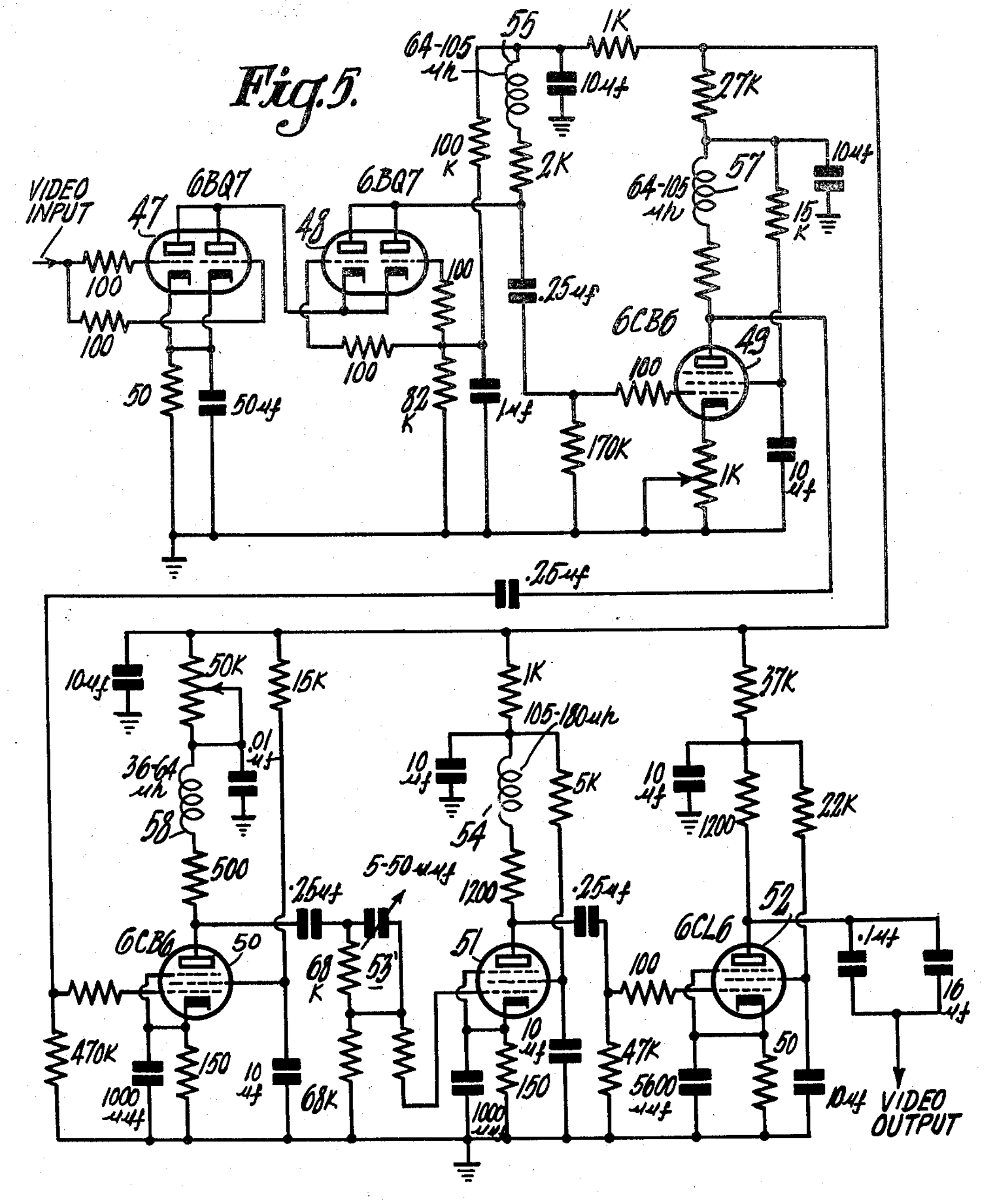
Fig. 5 is a circuit diagram of the video playback amplifier appearing in Fig. 2.

Figure 5 shows the details of a playback amplifier suitable for use at 25 in Fig. 1. Video signals from an input source such as the playback head 11 of Fig. 1 are applied to double amplifier tube 47 whose sections are in parallel with one another. Their combined output is applied via a direct coupling to the cathodes of another double amplifier tube 48 each of whose sections is also in parallel. Effectively, tube 47 and tube 48 are in series so that one operates as a variable resistance in series with the other. This arrangement has been known variously as a "driven-grounded-grid," "totem," or "cascade" circuit, and has proved to be extremely sensitive with a very high signal-to-noise ratio. This type of circuit is fully described in an article by R. M. Cohen appearing in "RCA Review," March 1951, at page 3. The high frequencies in the output of tube 48 are peaked by coil 55 and applied through a .25 mfd. coupling condenser in series with a 100 ohm resistor to the control grid of pentode amplifier 49. The output of the latter is high peaked by coil 57 and fed to the input of amplifier tube 50. The output of the latter is also high peaked by coil 58 and coupled via high frequency peaking circuit 53′ consisting of a 5–50 mmf. condenser across a 68,000 ohm resistor to the input of amplifier tube 51. In the plate circuit of the latter a high frequency peaking coil 54 is inserted and the signal is then coupled to the input electrode of tube 52. The video output for 75 ohm utilization circuits is taken from the plate of amplifier tube 52 by way of a circuit consisting of a .1 mfd. condenser in parallel with a 16 mfd. condenser.

It has been found that if the video recording driver 8 so acts upon the signals to be recorded as to produce an output waveform as shown at the head 9 of Fig. 3, superior reproduction is achieved. If the leading and trailing edges of input waves, as exemplified by square waves, are made sharper, the effective sharpness of the reproduced pictures is enhanced.

Figures 6, 7:
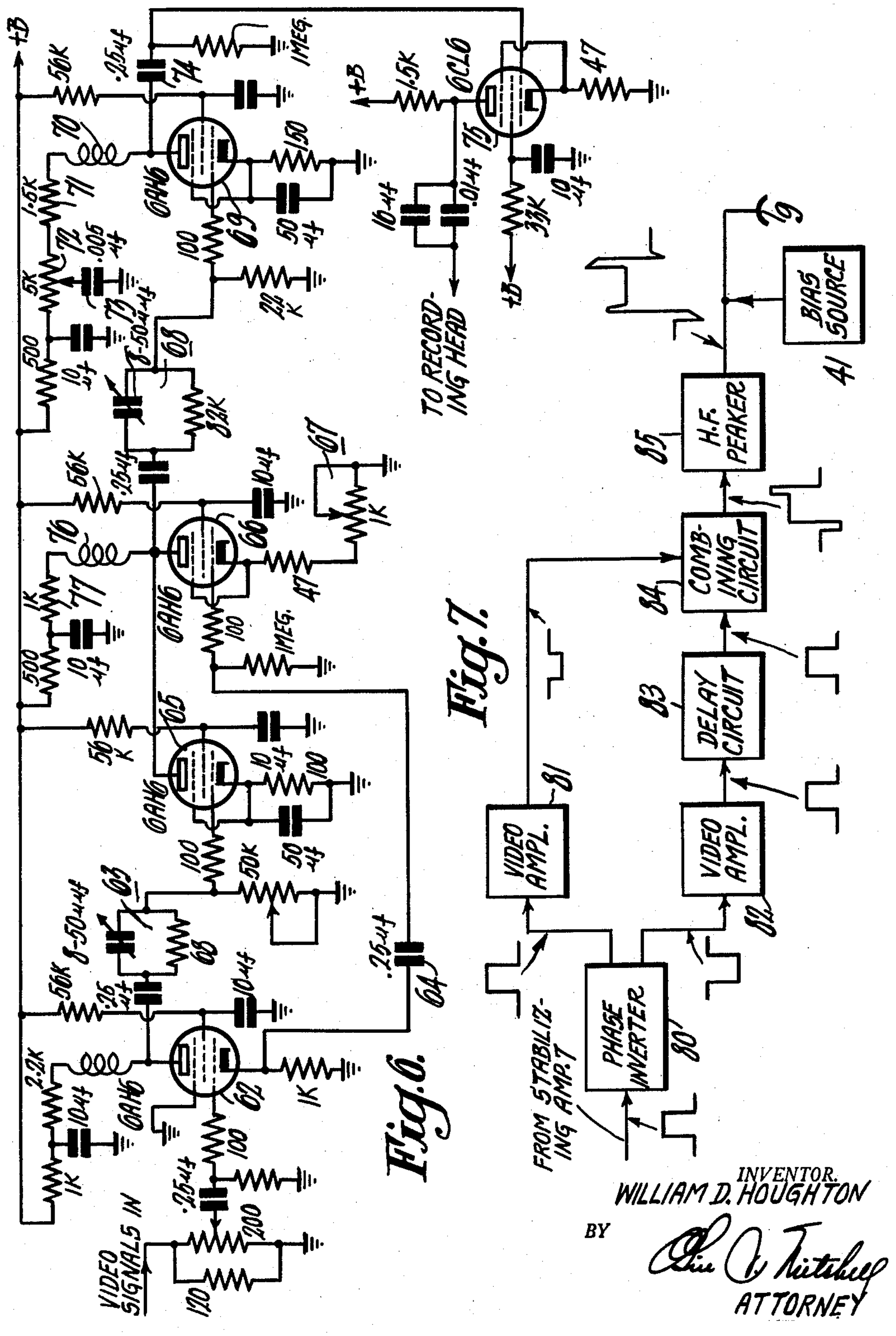
Fig. 6 is a schematic diagram of a video recording driver in another form of the invention.
Fig. 7 is a block diagram of still another video recording driver in still another form of the invention.

Although Fig. 4 is one preferred way to accomplish the desired recording characteristic concurrently with the development of a transfer correcting component, there are other alternative ways. The circuit of Fig. 6 shows one such alternative. The output of stabilizing amplifier 7 is applied through a potentiometer, which is a gain control, and a coupling capacitor to the control grid of a tube 62. The signals at the cathode of tube 62 are applied to the control grid of tube 66 as shown.

The signals appearing at the plate of tube 62 are applied to a high frequency peaking and phase shifting network 63. From network 63 the high frequencies are applied to the input of tube 65. The plate circuits of tubes 65 and 66 have a common load impedance consisting of peaking coil 76 and resistance 77. It is seen that the peaked high frequency components coupled to the common load impedances 76 and 77 are reversed in polarity relative to the wide band frequency components applied to the common load impedances via tube 66 and condenser 64.

The potentiometer 67 in the cathode circuit of tube 66 determines the amplitude of the unmodified wideband frequency components appearing in the output of tube 66. A peaking circuit 68 coupled to the outputs of tubes 65 and 66 is adjustable so as to permit selective peaking of desired high frequency ranges of the combined signals at the plates of tubes 65 and 66. The peaking circuit 68 couples the combined signals to tube 69. In the plate circuit of the latter a potentiometer 72 and a condenser 73 coupled thereto comprise a low frequency boosting network. In the same plate circuit a coil 70 and a resistor 71 constitute a high frequency peaking network. By adjusting the potentiometer 72 the low frequency characteristic of the signals applied to the grid of an output amplifier tube 75 via the condenser 74 are determined. As shown, the waveform at the output of tube 75 comprises the intelligence signal upon which has been superimposed a transfer correcting component seen as characteristic undershoot followed by an overshoot on its leading edge which makes for a steep slope from black to white. A converse condition exists at the trailing edge, i.e., there is first a slight increase in the white direction followed by a steep fall and an undershoot in the black direction.

Fig. 7 illustrates another approach to securing the desired composite waveform at the recording head. An intelligence input signal such as a square wave is applied to a phase inverter 80 which produces two output waves of opposite polarity as shown. These are applied to video amplifiers 81 and 82 respectively which preferably have broad band characteristics. It is seen that the wave at the output of video amplifier 81 has a smaller amplitude than the one at the output of amplifier 82. The gain of the amplifier 81 may be adjusted relative to the gain of amplifier 82 to produce this desired result. Coupled to amplifier 82 is a delay circuit 83 which delays the positive pulse a short time. In combining circuit 84 the negative pulse and the delayed positive pulse are combined producing the output pulse as shown. To improve the rise and fall times the high frequency peaker 85 is employed producing the composite waveform as shown. The intelligence component with the superimposed transfer correcting component is fed to head 9 together with a bias current from source 41.

As brought out hereinbefore, the improved transient and phase response characteristics possible in magnetic tape recording systems employing the present invention result from the provision of means for overcoming what may be termed the magnetic inertia of certain magnetic materials. Although it is convenient in some instances as shown above to directly modify the waveform of the intelligence signal to be recorded in accordance with the foregoing teaching so that a transfer correcting component is in effect added to the intelligence signal, it may be desirable to produce the transfer correcting signal component by other means. In order to appreciate this, it need only be remembered that the undershoot and overshoot modification of the recorded signal, as, for example, shown in Fig. 3, provides means for modifying the magnetic field imposed on the tape during the recording process at those time intervals corresponding to changes in the amplitude of the intelligence signal being recorded.

Again considering the embodiment of the invention shown in Fig. 3, the undershoot preceding the rising front edge of the waveform delivered to the input circuit of amplifier 34 causes the magnetic material, through which the magnetic recording flux passes, to undergo traversal of a portion of a minor hysteresis loop. The magnetic material influenced by this change in flux is that contained in both the recording head and the magnetic tape recording medium. The magnetic material in the playback head ultimately employed to reproduce the signal may also be affected by this undershoot and following overshoot of the signal to the degree that the undershoot and overshoot is actually represented on the remanent magnetization carried by the tape material. Further looking at the waveform applied to amplifier 34 in Fig. 3, the overshoot following the leading front edge of the input signal represents the traversal of at least a portion of the other side of the minor hysteresis loop initially defined by the undershoot preceding the leading front edge. This corresponds to the application of a transfer correcting to the magnetic recording field or at times corresponding to sharp transitions in the intelligence signal from one amplitude to another.

The amplitude of the transfer correcting component thus provided is a function of the magnitude of the amplitude change defining the front edge or trailing edge of the intelligence signal. Thus, the high frequency phase shifting and peaking processing of the signal to be recorded, in accordance with the technique illustrated in Figs. 3, 4, 6 and 7 are actually illustrative of the way in which a transfer correcting signal may be advantageously developed and employed in magnetic tape recording systems. In Figs. 3, 4, 6 and 7, both the effective amplitude of the correction signal as well as its timing are rendered a function of the waveform of the signal to be recorded.

As the practice of the present invention will demonstrate, it is not imperative that the magnetic field variations corresponding to the magnetic transfer correction component be necessarily imposed upon the bias signal.

Figure 8:
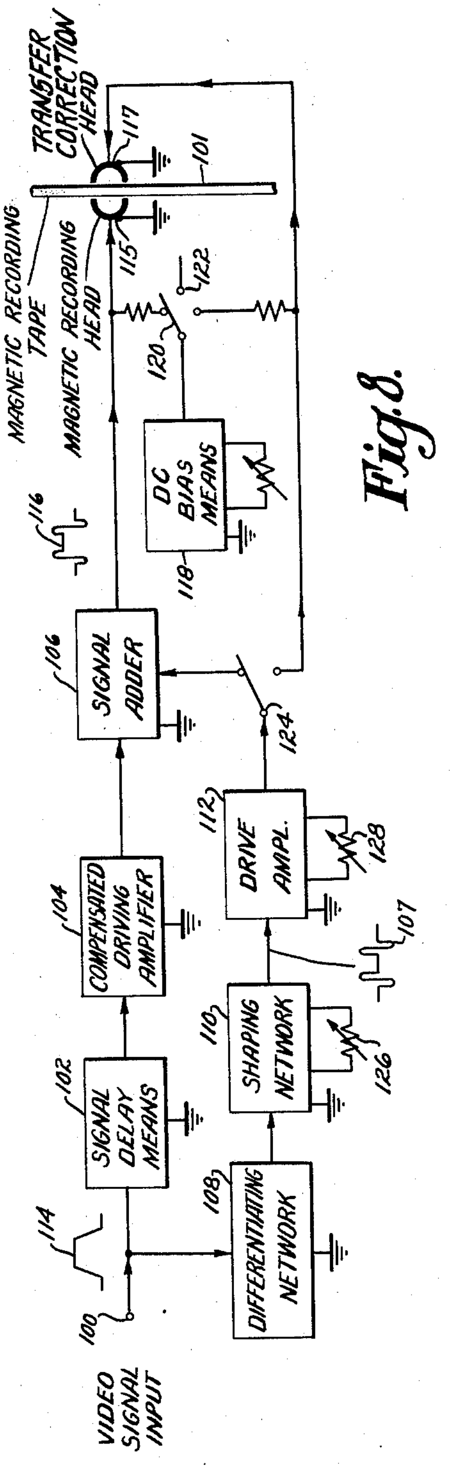
Fig. 8 illustrates a further embodiment of the invention.

Turning to the embodiment of the invention shown in Fig. 8, there is shown at 100 a video signal input terminal to which intelligence signal to be recorded on tape medium 101 is applied. The input signal is provided with two separate signal paths. The first path is defined by the signal delay means 102 in series with the driving amplifier 104 which in turn is coupled to the signal adder circuit 106. The driving amplifier may be conventional in form and unmodified for the purposes of the present magnetic transfer correction signal and includes the differentiation network 108, signal shaping network 110 and driving amplifier 112. The output of the drive amplifier is also coupled to an input of the signal adder circuit 106. Output signal from the adder 106 is then coupled to the magnetic recording head 115 which is in operative juxtaposition with one face of the tape recording medium 101.

For purposes of considering the operation of the arrangement in Fig. 8, it will be assumed that the video signal waveform applied to the input terminal 100 has a substantially square waveform component such as for example symbolized by the waveform 114. The differentiating network 108 differentiates the signal 114 and the resultant signal applied to the shaping network 110. Output signal from the shaping network may then correspond to the waveform 107 so that it may be later added with the representations of the input signal 114 to form the composite signal 116. D.-C. bias means 118 are shown in the arrangement of Fig. 8 for use when desired. Switch means 120 may be connected with either the magnetic recording head 115 or the transfer correction head 117 in operative juxtaposition with the other face of the recording tape 101. Switch 120 may also be left in a neutral position 122 so that no direct current bias flux is applied to either face of the magnetic recording tape. This may be desirable in recording extremely high frequencies. Switch 124 may be conditionally positioned to supply either the signal adder 106 or the transfer correction head 117 with the dynamic bias signal supplied by the drive amplifier 112. Elements 110 and 112 of Fig. 8 have been symbolically represented as adjustable through the agencies of the variable resistance symbols 126 and 128. The types of circuitry suitable for use in most of the block elements of Fig. 8 may be found through a reference to Fig. 4. For example, the differentiating network 108 may be provided through the use of the .25 microfarad capacitor and series resistor 53 in the anode circuit of tube 30 of Fig. 4. The parallel resistance capacitance network 31 of Fig. 4 may be used in supplying the shaping influence indicated by the shaping network 110 in Fig. 8. The delay means 102 may comprise nothing more than a section of well known delay line whereas the signal adder 106 may be nothing more than a resistive combining network. The magnetic recording head 115 and transfer correction head 117 may be conventional in form.

Figure 10:
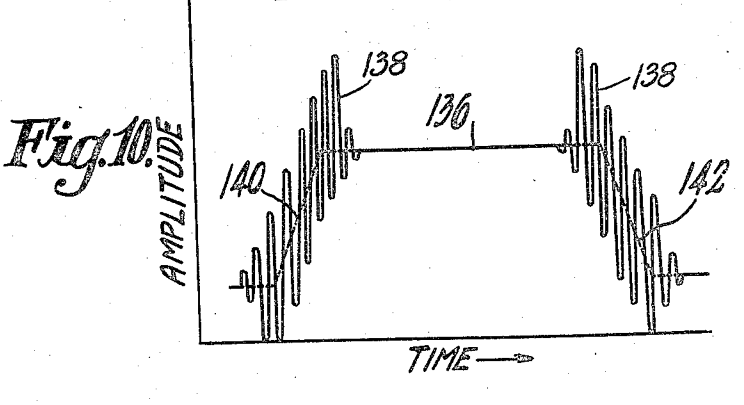
Figs. 9 and 10 illustrate the form and operation of a modification of Fig. 8.
Figure 9:
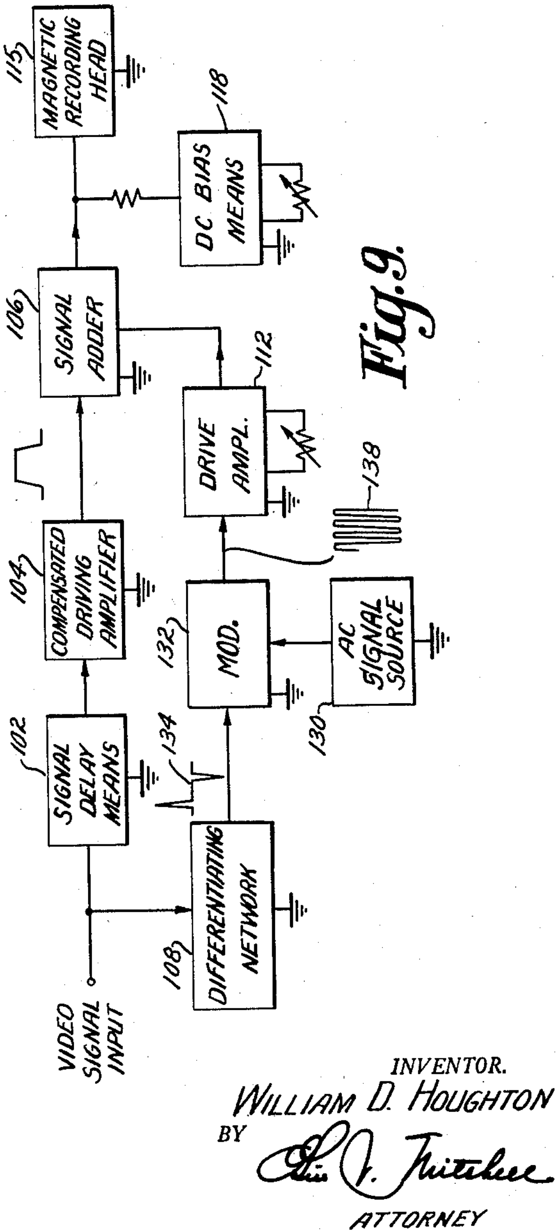

Figs. 9 and 10 illustrate the form and operation of a different embodiment of the present invention accomplishing the desired result. The transfer correction is accomplished by a recording field variation which is not in phase locked relation to the intelligence signal but corresponds to a very high frequency signal which is amplitude modulated by a phase locked signal corresponding to the correction signals described hereinbefore.

The circuit arrangement may be substantially identical to the arrangement of Fig. 8 with the exception that the signal delivered by the differentiating network 108 is employed to modulate a signal from a source of high frequency alternating current 130 through the agency of some form of conventional modulator circuit 132. The modulator circuit 132 acts to provide bursts of alternating current signal to the drive amplifier 112 in response to the differentiated edges of the intelligence signal being recorded. The modulator circuit 132 is responsive to both polarities of the differentiated signal 134 provided by the differentiating network 108. The transfer correction influence provided by the arrangement of Fig. 9 is illustrated in the graph of Fig. 10. The waveform 136 is representative of the signal applied to the magnetic record head 115. The waveform 136 is exaggerated in its duration so as to make more clear the operating principles of the invention. Here the transfer correction signal 138 supplied by the source 130 is shown to modulate the front edge 140 (shown in dotted lines) of the waveform 136. Likewise the back edge 142 of the waveform 136 is also modulated by the transfer correction signal 138. The modulator circuit 132 may be caused to have a relatively long time constant so as to make the application of the transfer correction signal 138 less abrupt.

Having thus described my invention, what is claimed is:

1. In a magnetic recording system for recording electrical signals on a moving magnetic recording medium the combination of: means for applying electrical intelligence signals to be recorded, said signals having a waveform representing repeated transitions from one amplitude to another; signal transducing means coupled with said applying means and so positioned relative to said medium as to transduce said electrical signals into representative variations in a magnetic recording field pattern imposed on said medium in recording relation thereto; and means responsive to amplitude variations in said intelligence signal to develop a magnetic transfer correction field the magnitude of which is proportional to said amplitude variations in said intelligence signal in supplementation to said recording field as it is imposed on said medium.

2. In a magnetic recording system for recording electrical intelligence signals through the agency of a moving magnetic recording medium, the combination of: terminal means for delivering electrical intelligence signals to be recorded, said signals having a waveform displaying repeated transitions from one amplitude level to another; signal transducing means coupled with said terminal means transducing said signals into a varying amplitude magnetic recording field; means positioning said transducing means in recording relation to said medium; means operatively coupled with said terminal means for developing a transfer correcting signal having upwardly and downwardly extending signal excursions timed to occur only during periods embracing amplitude transitions in said intelligence signal waveform; and means transducing said transfer correcting signal into a varying amplitude magnetic recording field in supplemental relation to the recording field produced by signal transducing means in response to said intelligence signals.

3. In a magnetic recording system for recording electrical intelligence signals through the agency of a moving magnetic recording medium, the combination of: terminal means for delivering electrical intelligence signals to be recorded, said signals having a waveform displaying repeated transitions from one amplitude level to another; signal transducing means coupled with said terminal means, transducing said signals into a varying amplitude magnetic recording field; means positioning said transducing means in recording relation to said medium; a source of electrical bias for said signal transducing means;

means coupling said bias source in operative relation to said transducing means; means operatively coupled with said terminal means for developing a transfer correcting signal having upwardly and downwardly extending signal excursions timed to occur only during periods embracing amplitude transitions in said intelligence signal waveform; and means transducing said transfer correcting signal into a varying amplitude magnetic recording field in supplemental relation to the recording field produced by signal transducing means in response to said intelligence signals.

4. In a magnetic recording system for recording electrical intelligence signals through the agency of a moving magnetic recording medium, the combination of: terminal means for delivering electrical intelligence signals to be recorded, said signals having a waveform displaying repeated transitions from one amplitude level to another; signal transducing means coupled with said terminal means transducing said signals into a varying amplitude magnetic recording field; means positioning said transducing means in recording relation to said medium; means operatively coupled with said terminal means for developing a magnetic transfer correcting signal comprising alternating current excursions, the amplitude of which is a function of the amplitude of difference between successive amplitude transitions on said intelligence signal and the timing of which is such that said alternating current excursions occur substantially only during intervals embracing the actual amplitude transitions in said intelligence signal; and means transducing said transfer correcting signal into a varying amplitude magnetic recording field in supplemental relation to the recording field produced by signal transducing means in response to said intelligence signals.

5. In a magnetic recording system for recording electrical signals on a moving magnetic recording medium, the combination of: means for applying electrical intelligence signals to be recorded, said signals having a waveform representing repeated transitions from one amplitude to another; signal transducing means coupled with said applying means and so positioned relative to said medium as to transduce said electrical signals into representative variations in a magnetic recording field pattern imposed on said medium in recording relation thereto; and means responsive to amplitude variations in said intelligence signal to develop a magnetic transfer correction field having magnetic excusions extending in two directions, the magnitude of which are proportional to said amplitude variations in said intelligence signal, in supplementation to said recording field as it is imposed on said medium.

6. In a magnetic recording system for recording electrical intelligence signals through the agency of a moving magnetic recording medium the combination of: terminal means for delivering electrical intelligence signals to be recorded, said signals hving a waveform displaying repeated transitions from one amplitude level to another; signal transducing means coupled with said terminal means transducing said signals into a varying amplitude magnetic recording field; means positioning said transducing means in recording relation to said medium; means operatively coupled with said terminal means for developing a transfer correcting signal having upwardly and downwardly extending signal excursions timed to occur only during periods embracing amplitude transitions in said intelligence signal waveform; and means coupling said transfer correction signal developing means to said signal transducing means.

7. In a magnetic recording system for recording electrical signals on a moving magnetic recording medium, the combination of: means for applying electrical intelligence signals to be recorded, said signals having a waveform representing repeated transitions from one amplitude to another; signal transducing means coupled with said applying means and so positioned relative to said medium as to transduce said electrical signals into representative variations in a magnetic recording field pattern imposed on said medium in recording relation thereto; and means responsive to the sharp amplitude variations in said intelligence signal to develop a magnetic transfer correction field the magnitude of which is proportional to said amplitude variations in said intelligence signal in supplementation to said recording field as it is imposed on said medium.

References Cited in the file of this patent

UNITED STATES PATENTS

| | | |
|---|---|---|
| 1,976,355 | Mees | Oct. 9, 1934 |
| 2,444,854 | Schlesinger | July 6, 1948 |
| 2,604,546 | Connell | July 22, 1952 |
| 2,695,331 | Johnson | Nov. 23, 1954 |